United States Patent [19]

Proulx

[11] Patent Number: 5,681,438
[45] Date of Patent: Oct. 28, 1997

[54] MEMBRANE MODULE ASSEMBLY

[75] Inventor: Andrew G. Proulx, Concord, Mass.

[73] Assignee: Millipore Corporation, Bedford, Mass.

[21] Appl. No.: 656,138

[22] Filed: May 31, 1996

[51] Int. Cl.⁶ .......................... B01D 61/44; B01D 61/48
[52] U.S. Cl. .......................... 204/627; 204/630; 204/632; 204/636; 204/639
[58] Field of Search .................................. 204/632, 636, 204/639, 627, 630

[56] References Cited

U.S. PATENT DOCUMENTS 3,371,028  2/1968  Tsunoda et al. .................. 204/636
4,569,747  2/1986  Kedem et al. ...................... 204/636
5,292,422  3/1994  Liang et al. ........................ 204/632

*Primary Examiner*—Arun S. Phasge
*Attorney, Agent, or Firm*—John Dana Hubbard

[57] ABSTRACT

A membrane module in which non-porous membranes are bonded to spacer elements, which elements are in turn bonded to each other to create a membrane support zone as a result of contact with the surface of the membrane opposite the surface to which the membrane is bonded. The membrane is restrained from peeling from the membrane bond by the support zone under opposing pressure as may be caused by fluid flowing past the membrane. The preferred use of such a membrane module is for continuous electrodeionization processes.

18 Claims, 7 Drawing Sheets

MEMBRANE MODULE ASSEMBLY

FIELD OF THE INVENTION

This invention relates generally to apparatus for conducting fluid separations. More particularly, this invention relates to such apparatus which use non-porous membranes to effect the separation.

BACKGROUND OF THE INVENTION

Two fluid separation processes which involve the use of non-porous membranes are electrodialysis and electrodeionization (EDI), which is a particular technique that has enjoyed commercial success in the recent past. An EDI system involves a combination of ion exchange membranes, ion exchange resins and electrodes for creating an electric potential to pass direct current through the device. This combination serves to transfer, and ultimately remove, undesired ions from the sample fluid being processed. EDI is used in many applications such as the removal of salt from water and the removal of organic impurities from water streams. There are many patents which have been issued covering EDI processes and devices, including U.S. Pat. Nos. 4,632,745; 4,925,541; 4,931,160; 4,956,071; and 5,154,809.

Fluid separation processes that use non-porous membranes involve considerations not present in microfiltration or even ultrafiltration separation processes. This is primarily due to the fact that there is no bulk flow through the membrane and in certain applications back pressure results in the non-porous membrane being made susceptible to peeling from its bond surface. As used herein, the term "non-porous membrane" refers to those membranes which generally have some structural porosity (even if there are no surface pores) but which are used in applications in which the bulk flow through the membrane is not a requirement and may even be undesired. Non-porous membranes are typically several times thicker than microfiltration or ultrafiltration membranes, a fact which presents problems in sealing the membranes to support structures.

One example of an EDI module assembly is described in U.S. Pat. No. 4,747,929 whose description is hereby incorporated by reference. In this patent, ion exchange membranes are sealed to spacer assemblies to form in stacked fashion open channels, namely alternating dilution and concentration compartments (as these terms are defined in the EDI field). The cross-section of FIG. 1 is a simplification of part of the module assembly described in this patent. Because the membrane extends to the periphery of the spacer, compressive forces (F) must be continuously applied to the membrane/spacer bond region to prevent or minimize leaks from the compartments along the bond seal to the outside environment and between the concentration and dilution stream ports of the spacers. During operation, adjustments to the compressive forces are often required due to effects of fluid pressure and temperature on the system and plastic creep of the components.

A modification of the EDI module assembly shown in FIG. 1 is depicted in the cross-section of FIG. 2, which represents a product currently sold by Millipore Corporation under the tradename Elix as Catalog No. ZDCDSTD20. This configuration eliminates the probability of leakage to the outside environment by the addition of an external bonding region beyond the extremities of the membrane thereby allowing for spacer to spacer bonding. The potential for leaks between dilution and concentration compartments at the membrane bond is minimized by the application of compressive force (F) to a screen positioned on top of each membrane bond which extends beyond the dimensions of the compartment length and width. The design of this membrane support requires careful selection of the screen and application of the module compressive force. A screen which has large strand spacing and/or inadequate compressive force at the membrane bond/screen interface may cause the membrane to peel when the pressure in the dilution compartment is higher than the pressure in the concentration compartment. While the design of the module assembly of FIG. 2 has met with commercial success and functions well in its intended application, there are limitations to the range of potential screen strand geometries that can be used. In addition, since the screen is wider than the flow channel, some fluid flow is "wasted" because the fluid sample passes over inactive membrane at the bond regions. The proportion of "wasted" flow to flow over active membrane area becomes more significant with narrower channel widths.

Accordingly, the need exists for an improved membrane module assembly useful in fluid separation processes involving non-porous membranes which prevents external leakage of the fluid being separated, further decreases susceptibility to membrane peel, essentially eliminates leaks at the membrane bond, and maximizes useable membrane area.

SUMMARY OF THE INVENTION

The foregoing disadvantages and limitations of the prior art are overcome by providing in accordance with the present invention a membrane module in which non-porous membranes are bonded to spacer elements along the entire periphery of an inner peripheral surface of the spacer element. The spacer elements are in turn bonded together to create a membrane support zone as a result of contact by the adjacent spacer element with the surface of the membrane opposite the bonded membrane surface at the inner peripheral surface. Thus the membrane is restrained from peeling from the membrane bond when pressures are generated which oppose the bond such as may be caused by fluid flowing past the membrane.

In accordance preferred embodiment, a first non-porous membrane is bonded to one surface of a first spacer element along the entire periphery of the inner peripheral surface. A second non-porous membrane is similarly bonded to a second spacer element. The two membrane/spacer assemblies are then bonded along the entire periphery of an outer peripheral surface to sandwich the first non-porous membrane between adjacent spacer elements such that a support zone for the membrane is formed as a result of contact with the surface opposite to which the membrane is bonded. The modular bonding process can be repeated to form a membrane module assembly having any desired number of flow compartments (defined by the region between adjacent membranes). An appropriate end cap assembly can be bonded to complete the module and thus form a self-supporting membrane/spacer module assembly. A preferred application for the membrane module assembly is for EDI fluid separation process.

These and other aspects and advantages of the present invention will become apparent from the following detailed description taken in conjunction with the description of the drawings.

PREFERRED EMBODIMENTS

Figure 1:
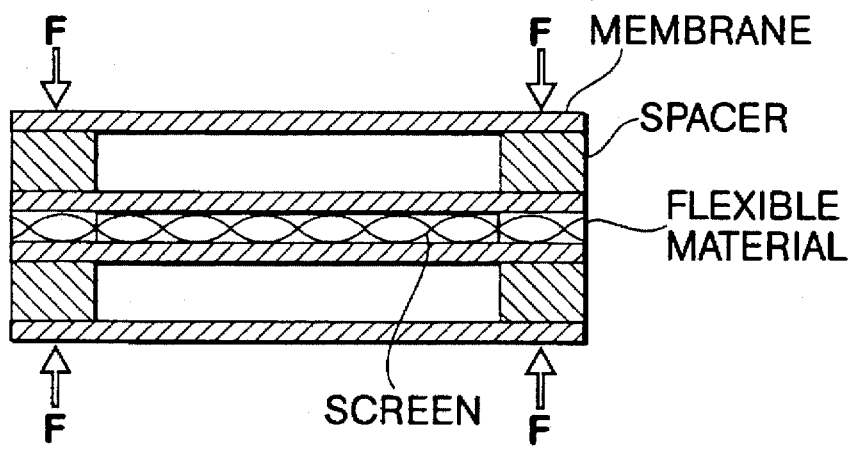
FIG. 1 is a cross-section of a prior art spacer/membrane assembly.
Figure 2:
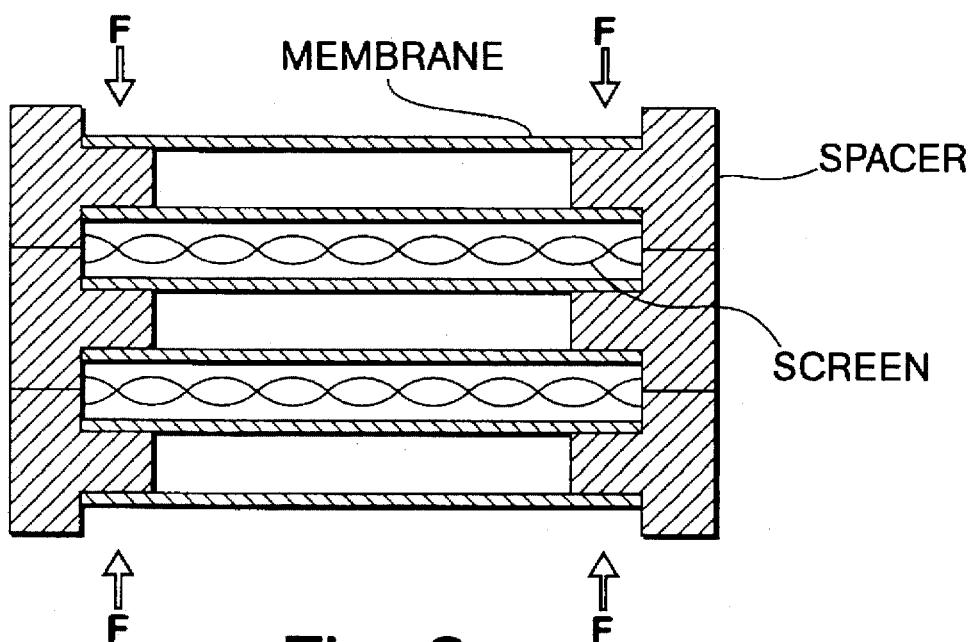
FIG. 2 is a cross-section of another prior art spacer/membrane assembly.
Figure 3A:
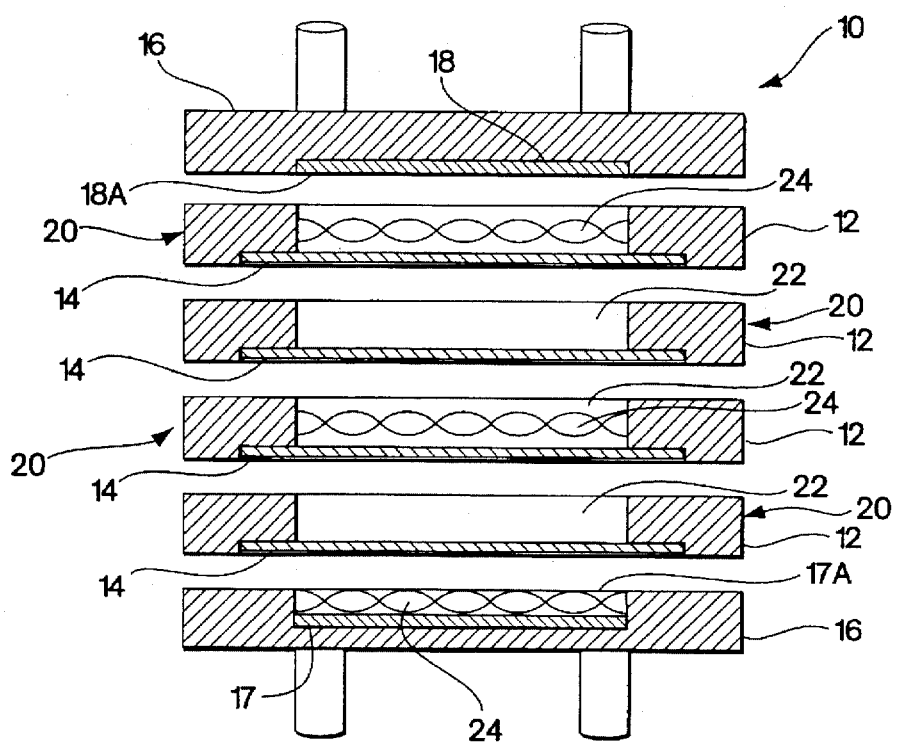
FIG. 3A is an exploded cross-section of an EDI module showing individual membrane/spacer assemblies, electrodes, fluid ports and end cap assemblies prior to the joining of the assemblies to form an operational EDI module in accordance with a preferred embodiment of the present invention.
Figure 3B:
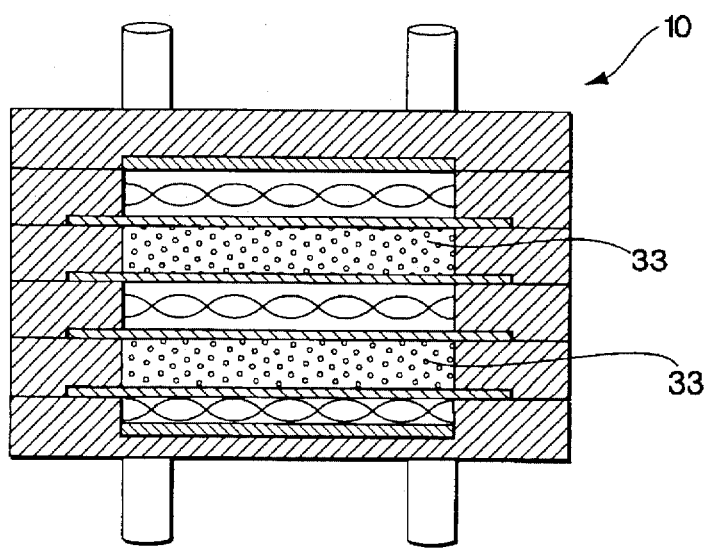
FIG. 3B shows the module of FIG. 3A bonded together in accordance with a preferred embodiment of the present invention.

An EDI module assembly 10 constructed in accordance with the present invention is best illustrated in FIGS. 3A and 3B. The module includes a series of spacers 12, each having an ion exchange membrane 14 bonded to the back surface (oriented toward the bottom of FIGS. 3A and 3B) of the individual spacers. A pair of opposing end caps 16 are bonded to the respective outermost spacer. Each end cap includes a recess which, for EDI applications, is used to house at one end of the device an anode 17 and at the other end a cathode 18.

The non-porous ion exchange membranes 14 are bonded to the individual spacers 12 through any number of bonding techniques, preferably by heat fusion bonding with the most preferred mode being vibration welding, to form a membrane/spacer assembly 20. Each individual membrane/spacer assembly is then bonded to an adjacent membrane/spacer assembly that an open channel 22 is created between membranes, which in an EDI system serves as a flow channel either for the purified fluid whose constituents have been separated or for the waste fluid. As will presently be described, the purifying flow channels contain ion exchange resins 33. Furthermore, in some applications the waste flow channel may also contain ion exchange resins. Also included for maintaining the appropriate channel height between adjacent membranes is a screen 24. The completed assembly can be built from the bottom up (as viewed in FIG. 3B) by bonding one spacer at a time to the top of the spacer below it. The top end cap forms a cathode compartment 18A and the bottom end cap forms an anode compartment 17A. The assembled end caps also provide structural rigidity such that the membrane module assembly is self-supporting.

Figure 4:
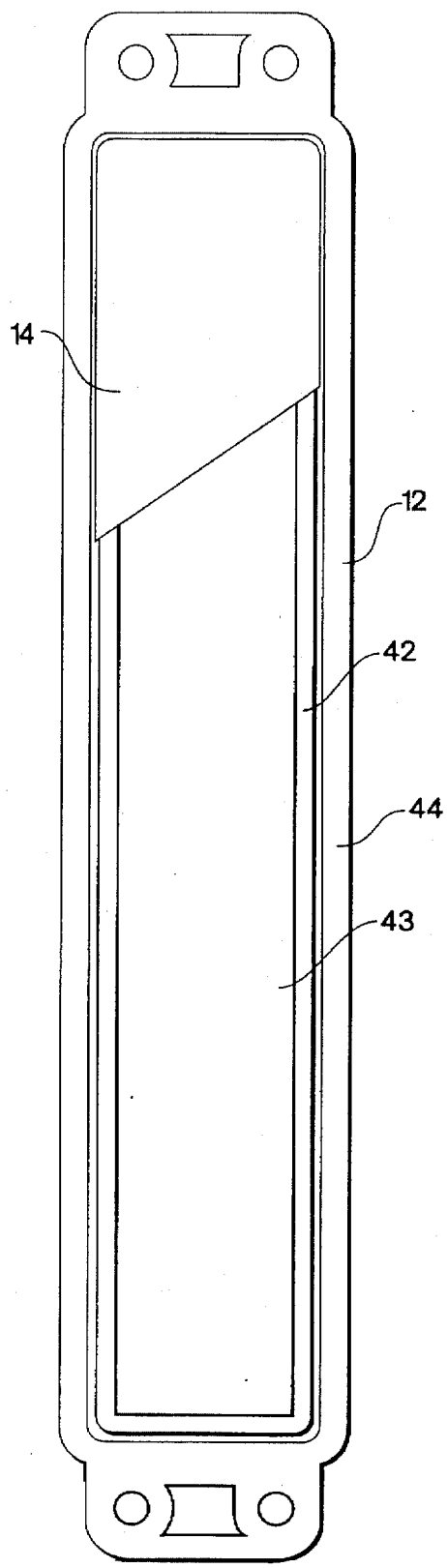
FIG. 4 is an elevation view of the back surface of a spacer assembly constructed in accordance with a preferred embodiment showing a non-porous membrane bonded to the back surface.

FIG. 4 shows the back surface of the spacer 12 which includes an inner peripheral surface 42 which extends around the entire periphery of an open channel 43. Extending laterally toward the periphery of the spacer is an adjacent outer peripheral surface 44 which is raised from the inner peripheral surface so as to confine the membrane to be bonded within the region of the inner peripheral surface. As shown in FIG. 3A the thickness of the membrane is less than the height of the adjacent outer peripheral surface to form a step 46 protruding above the membrane 14.

Figure 5:
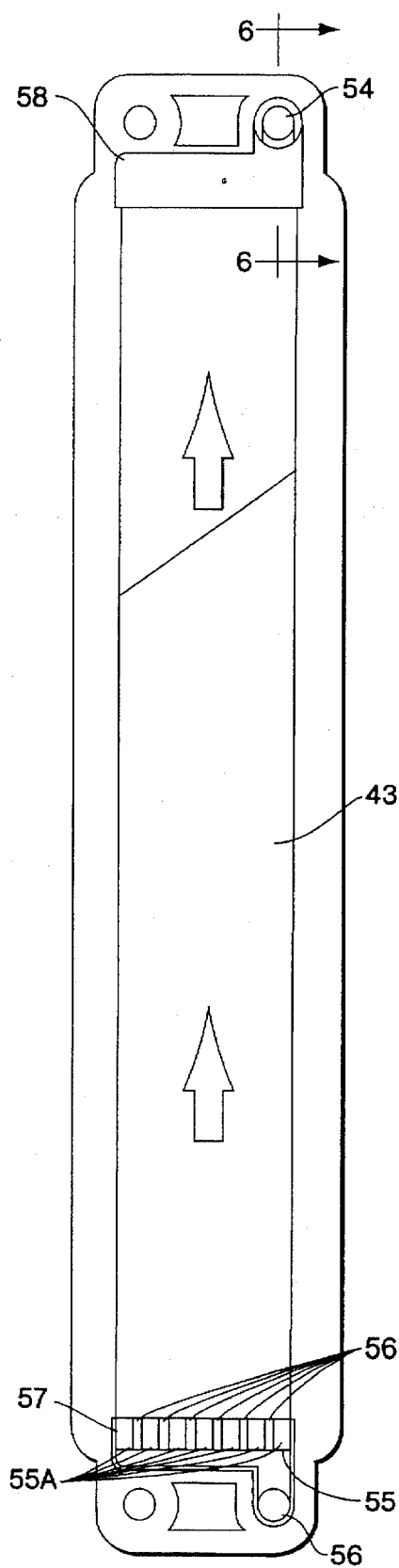
FIG. 5 is an elevation view of the front surface of the spacer assembly of FIG. 4 with the distributor cap at the fluid inlet removed to show fluid flow.

FIG. 5 shows the front surface of the spacer 12 and provides greater detail of the fluid flow path within the spacer. Fluid enters the spacer at an inlet port 52 and exits after flowing through the channel 43 at an outlet port 54. The inlet port is in fluid communication with a distributor 55 having individual channels 55A formed from a series of ridges 56 molded in a recess 57 at the top of the spacer and closed by a distributor cap 58 bonded to the top of the ridges. This arrangement allows for uniform fluid flow through the channel and containment of ion exchange resin (not shown) be explained in more detail below. A similar flow arrangement is provided at the outlet port. Other flow distribution techniques can be employed such as porous plastic as well as the use of a membrane over the distributor instead of a cap.

Figure 6:
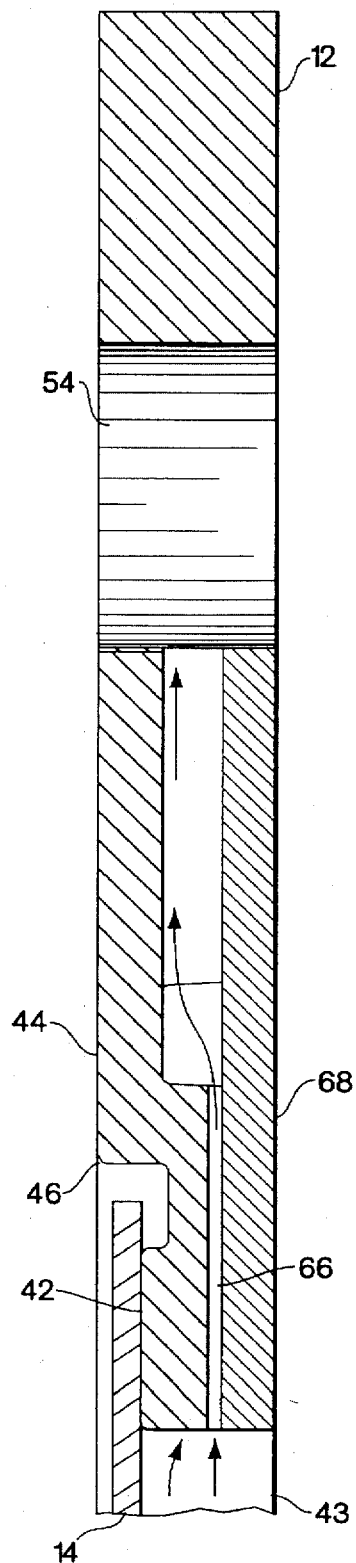
FIG. 6 is a cross-section through Section A—A of the spacer assembly of FIG. 5 showing the fluid outlet from the channel.

FIG. 6 shows in greater detail the fluid communication between the channel 43 and the outlet port 54. Fluid from the channel flows into a distributor 66 which is constructed in the same fashion as the distributor 55 and which is covered by a distributor cap 68. The fluid is then directed to the outlet flow port. Series or parallel flow between membrane/spacer assemblies is effected by either blocking the outlet port with the solid periphery of an adjacent membrane/spacer assembly or by aligning the ports of adjacent membrane/spacer assemblies respectively.

FIG. 6 also shows details of the membrane 14 bonded to the inner peripheral surface 42. The surface of the membrane which is bonded is often referred to as the bonded membrane surface, with the opposite membrane surface being the unbonded membrane surface. The support for the membrane bond is accomplished when an adjacent spacer is bonded to the outer peripheral surface 44. When adjacent membrane/spacer assemblies are bonded together (see also FIG. 3B), both the step 46 and the opposing surface of the adjacent surface melt and flow to bring about contact between the inner peripheral surface of the adjacent spacer and the unbonded surface of the membrane. In some cases it may be desirable to actually form a bond with the other side of the membrane (i.e. the surface of the membrane opposite to that which the membrane is initially bonded to its membrane/spacer assembly). Regardless of whether the other side of the membrane is contacted or bonded, the membrane is completely encapsulated by a support zone and the risk of peeling from the membrane bond due to pressure being applied opposite to the membrane bond is essentially eliminated. Also, the support zone decreases the potential for interchannel leakage through defects in the membrane bond by increasing the path length that the fluid must flow to reach an adjacent channel. The bonded outer peripheral surfaces also prevent leakage of flowing fluid to the ambient environment.

Figure 7:
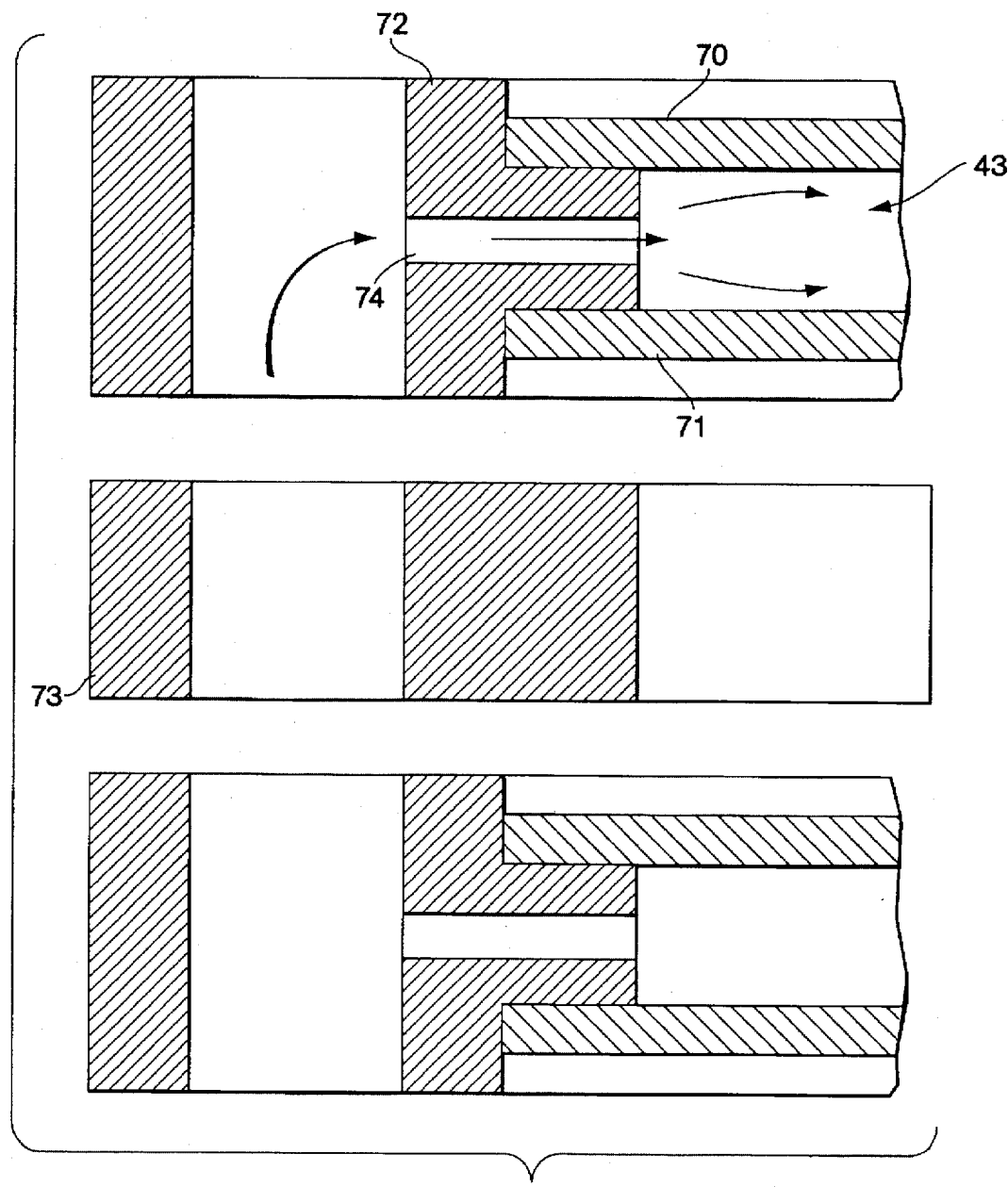
FIG. 7 is a cross-section of a membrane/spacer assembly constructed in accordance with an alternate embodiment.

FIG. 7 shows an alternate construction of the membrane/spacer assembly in which two membranes 70, 71 are bonded to a single spacer 72. In this instance, an additional spacer 73 without membrane bonded to it is inserted between adjacent membrane/spacer assemblies to produce a bond which avoids peel. (For sake of consistency, FIG. 7 also shows an identical spacer 72 with two membranes bonded to it.) As discussed above, the entire periphery of the bonded outer peripheral surfaces prevent external leakage. In addition, a support zone for the membranes is formed as a result of contact (or if desired through bonding) with the surface of the membrane opposite the membrane's bonded surface, thereby preventing peeling of the membrane from the membrane bond under the pressure of fluid flowing in the channel in the same manner as discussed above. For this embodiment a passageway 74 is formed in the membrane/spacer assembly that permits access through the inlet spacer to the flow channel 43. Alternatively, it is possible to form this passageway in the spacer 73 depending on the desired configuration of the module.

Figures 8A, 8B:
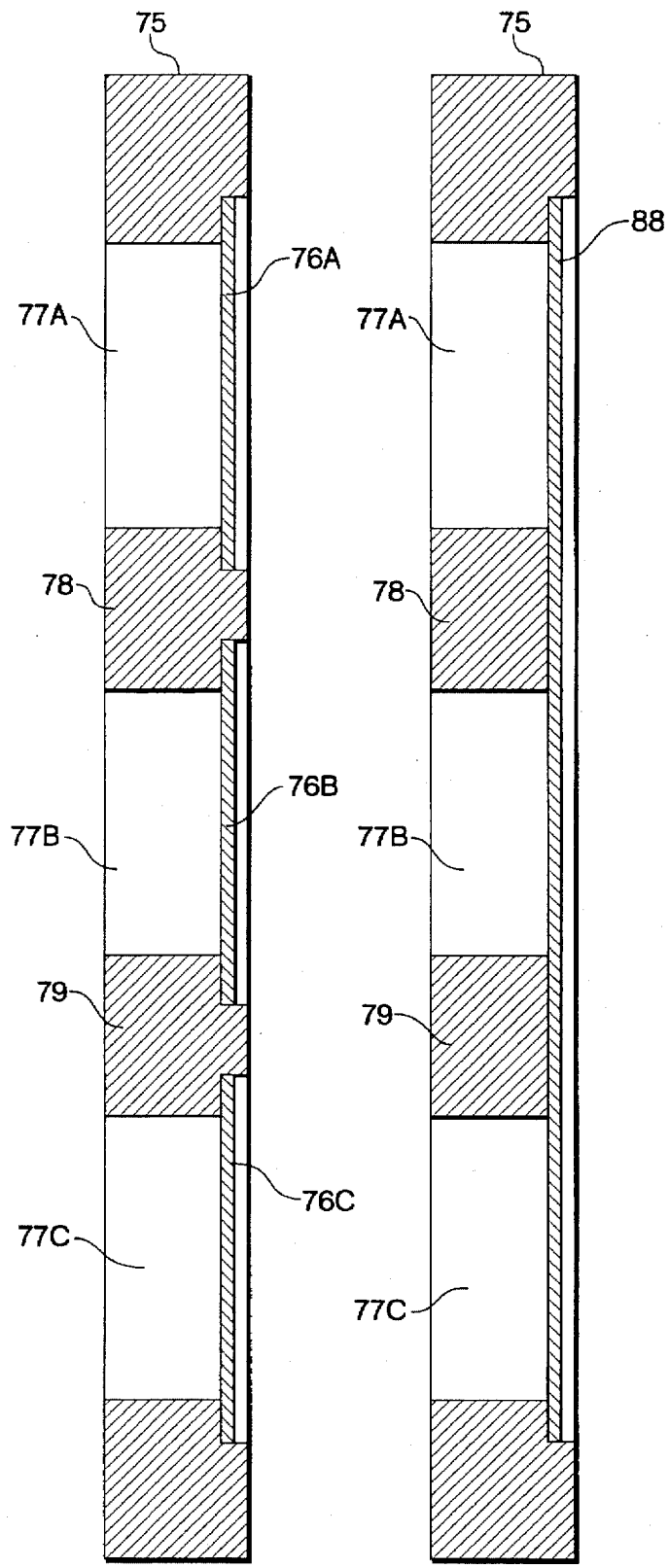
FIG. 8A is a cross-section of a membrane/spacer assembly constructed in accordance with yet another alternate embodiment.
FIG. 8B is a cross-section of an alternate form of the embodiment of FIG. 8A.

FIG. 8A shows a further embodiment of the membrane/spacer assembly in which three membranes, 76A, 76B and 76C are bonded to a spacer 75. In this instance, a pair of ribs 78, 79 extend longitudinally from an end of the channel 22 to the other to form multiple internal compartments 77A, 77B and 77C. Each of the membranes are bonded to the spacer and/or to the ribs in a similar fashion as that described with respect to the embodiment of FIGS. 3A and 3B. This arrangement allows adjacent membrane/spacer assemblies to be bonded at the outer peripheral surface each of the ribs thereby providing additional structural rigidity to the module.

FIG. 8B is similar to the embodiment of FIG. 8A except that a single membrane 88 is bonded to the spacer including the ribs. The ribs form smaller geometry sub-compartments of consistent thickness and provide additional bonding surface for the membrane. It is also possible to form subcompartments using combinations of the FIGS. 8A and 8B embodiments.

The preferred embodiment for utilizing the membrane/spacer assembly constructed in accordance with the present invention is an EDI system as shown in FIGS. 3A and 3B. The EDI apparatus consists of a plurality of membrane/spacer assemblies and also includes anode and cathode compartments 17A, 18A formed by the end caps 16. Positioned within each respective end cap is an electrode which forms the anode 17 and the cathode 18 and which is connected to a voltage source (not shown). The arrangement and function of anode, cathode and alternating ion exchange membranes is described in U.S. Pat. No. 4,632,745 whose disclosure is incorporated herein by reference.

Briefly summarized, each channel bound by ion exchange membranes forms alternating depletion and concentration compartments. The depletion compartments contain ion exchange resin particles whose size is greater than the height of the passageways between channels 55A and the cap 58 which form the distributor 55 (as well as the height of similar passageways contained in distributor 66). For the embodiment of FIGS. 3A and 3B each depletion compartment includes a single channel housing resin particles; however, as discussed with respect to the embodiments of FIGS. 8A and 8B each depletion compartment may include subcompartments which provide multiple flow channels within an individual depletion compartment. The liquid to be depleted of ions is passed either in series or in parallel through each depletion compartment within the device. A second electrolytic fluid is passed through each of the concentration compartments to produce transfer of ions from the liquid in the depletion compartment to the electrolytic liquid in the concentration compartment. In systems where a plurality of EDI modules are used, the liquid removed from the depletion compartments in an upstream module can be fed in series or parallel through depletion compartments in the next adjacent downstream module. Similarly, liquid removed from the concentration compartments of an upstream module can be fed in series or parallel to the concentration compartment of the next adjacent downstream module. The applied voltage produces an electric current in each module which results in the efficient transfer of ions through the membranes and into the respective flow channels.

In use, the liquid which is to be deionized enters the inlet port 52 and is directed uniformly through the distributor 55 to minimize channeling effects. The incoming liquid then flows in the channel 43 and contacts the resin particles which are subjected to an electrical voltage and consequently passes anions through an anion permeable membrane and cations through a cation permeable ion exchange membrane. The purified liquid passes through the outlet port 54 and is collected for further use.

Although the invention has been described in detail above, this is solely for purposes of illustration and should not be considered limiting as modifications may become apparent to those of skill in the art without departing from the scope of the invention as defined in the accompanying claims.

I claim:

1. A module assembly for use in fluid separations processes comprising:

at least first and second spacer elements each having opposing spaced apart faces surrounding an opening;

each of said faces having an outer planar peripheral surface and an adjacent inner planar peripheral surface;

a first non-porous membrane bonded to said first spacer element along the entire periphery of one of said inner peripheral surfaces thereof;

a second non-porous membrane bonded to said second spacer element along the entire periphery of one of said inner peripheral surfaces thereof;

means for bonding the face of said second spacer element opposite where said second membrane is bonded to said outer peripheral surface of said first spacer element where said first membrane is bonded to produce a continuous bond between the outer peripheral surfaces of said first and second spacer elements and to define a compartment bounded by said membranes in which fluid is adapted to flow;

fluid inlet and fluid outlet means in either of said first or second spacer elements communicating with said compartment;

said bonding means for said first and second spacer elements forming a membrane support zone for said first membrane as a result of contact between the inner peripheral surface opposite where said second membrane is bonded and the unbonded membrane surface of said first membrane; and means, bonded to the outer peripheral surface of said second spacer element and the unbonded membrane surface of said second membrane, for forming a membrane support zone for said second membrane.

2. The assembly of claim 1 wherein said first and second membranes and said first and second spacer elements are bonded by vibration welding.

3. The assembly of claim 1 wherein said first and second membranes and said first and second spacer elements are bonded by heat fusion.

4. The assembly of claim 1 wherein said means bonded to the outer peripheral surface of said second spacer element is a third spacer element having opposing spaced apart faces surrounding an opening, said faces comprising an outer planar peripheral surface and an adjacent inner planar peripheral surface.

5. The assembly of claim 4 wherein said spaced apart faces of said third spacer element comprise generally planar and continuous surfaces.

6. The assembly of claim 1 wherein said means bonded to the outer peripheral surface of said second spacer element is a closed end cap element having at least one face comprising generally planar and continuous surfaces, said face comprising an outer planar peripheral surface and an adjacent inner planar peripheral surface.

7. The assembly of claim 4 or 6 wherein said inner peripheral surface of said third spacer element or said end cap element and said inner peripheral surface of said second spacer element are bonded to the respective surfaces of said first and second membranes opposite to that which said first and second membranes are bonded to their respective spacer elements.

8. A module assembly use in fluid separations processes comprising:

- at least first, second and third spacer elements each having opposing spaced apart faces surrounding an opening;
- each of said faces having an outer planar peripheral surface and an adjacent inner planar peripheral surface;
- a first non-porous membrane bonded to said first spacer element along the entire periphery of one of said inner peripheral surfaces thereof;
- a second non-porous membrane bonded to said first spacer element along the entire periphery of the other of said inner peripheral surfaces thereof;
- the combination of said first and second membranes bonded to said first spacer element defining a compartment in which fluid is adapted to flow;
- means for bonding one face of said second spacer element to said outer peripheral surface of said first spacer element and means for bonding one face of said third spacer element to said outer peripheral surface of said second spacer element to produce a continuous bond between the respective outer peripheral surfaces of said first, second and third spacer elements;
- fluid inlet and fluid outlet means in one of said first, second or third spacer elements communicating with said compartment;
- said bonding means for said first, second and third spacer elements forming a membrane support zone for both said first and second membranes as a result of contact between the inner peripheral surface of said one face of said second and third spacer element and the unbonded membrane surfaces of said first and second membranes.

9. The assembly of claim 8 wherein said first and second membranes and said first, second and third spacer elements are bonded by vibration welding.

10. The assembly of claim 8 wherein said first and second membranes and said first, second and third spacer elements are bonded by heat fusion.

11. The assembly of claim 8 wherein said inner peripheral surface of said third spacer element and said inner peripheral surface of said second spacer element are bonded to the respective surfaces of said first and second membranes opposite to that which said first and second membranes are bonded to their respective spacer elements.

12. The assemble of claim 1 or 8 wherein said spaced apart faces comprise generally planar and continuous surfaces.

13. The assembly of claim 1 or 8 wherein at least one of said opposing faces of said spacer elements comprise an outer planar peripheral surface and an adjacent inner planar peripheral surface lying in different, non-overlapping planes.

14. The assembly of claim 1 or 8 wherein said spacer elements include one or more longitudinally extending ribs to form multiple compartments within said opening.

15. The assembly of claim 14 including individual membranes bonded to said inner peripheral surface and said ribs or bonded between said ribs.

16. The assembly of claim 14 including a single membrane bonded to said inner peripheral surface and each of said ribs.

17. The assembly of claim 1 or 8 wherein said surface of said first membrane opposite to which said first membrane is bonded to said first spacer element is bonded to either said second spacer element or said third spacer element.

18. The assembly of claim 1 or 8 used for continuous electrodeionization processes.

\* \* \* \* \*